United States Patent
Lu et al.

(10) Patent No.: US 12,541,559 B1
(45) Date of Patent: Feb. 3, 2026

(54) AUTONOMOUS MOBILE DEVICE, CONTROL METHOD APPLIED TO AUTONOMOUS MOBILE DEVICE, AND CONTROLLER

(71) Applicant: VisionNav Robotics USA Inc., Acworth, GA (US)

(72) Inventors: Yujie Lu, Acworth, GA (US); Fan Zheng, Acworth, GA (US); Mu Fang, Acworth, GA (US); Bingchuan Yang, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/178,024

(22) Filed: Apr. 14, 2025

Related U.S. Application Data

(63) Continuation of application No. 19/174,544, filed on Apr. 9, 2025.

(51) Int. Cl.
| | | |
|---|---|---|
| *G06F 16/906* | (2019.01) | |
| *G05D 1/242* | (2024.01) | |
| *G05D 107/70* | (2024.01) | |
| *G05D 111/30* | (2024.01) | |

(52) U.S. Cl.
CPC .......... *G06F 16/906* (2019.01); *G05D 1/242* (2024.01); *G05D 2107/70* (2024.01); *G05D 2111/30* (2024.01)

(58) Field of Classification Search
None
See application file for complete search history.

(56) References Cited

U.S. PATENT DOCUMENTS

| | | | |
|---|---|---|---|
| 11,609,868 B1* | 3/2023 | Ravikumar | G06F 13/1668 |
| 11,815,623 B2* | 11/2023 | Deng | G01S 7/41 |
| 2020/0385207 A1 | 12/2020 | Godwin et al. | |
| 2021/0215505 A1* | 7/2021 | Castorena Martinez | G01D 18/00 |
| 2022/0100192 A1 | 3/2022 | Voisin et al. | |
| 2023/0004797 A1* | 1/2023 | Chiu | G06N 3/08 |
| 2023/0097251 A1* | 3/2023 | Adams | B60W 50/0205 701/29.2 |
| 2023/0118889 A1 | 4/2023 | Horkey et al. | |

(Continued)

FOREIGN PATENT DOCUMENTS

| | | |
|---|---|---|
| CN | 208833914 U | 5/2019 |
| CN | 212669124 U | 3/2021 |

(Continued)

OTHER PUBLICATIONS

Yeong et al., "Sensor and Sensor Fusion Technology in Autonomous Vehicles: A Review", Mar. 18, 2021, Sensors 2021, 21, 2140, pp. 1-37 (Year: 2021).*

(Continued)

*Primary Examiner* — Tamara L Weber
(74) *Attorney, Agent, or Firm* — MUNCY, GEISSLER, OLDS & LOWE, P.C.

(57) ABSTRACT

The present disclosure relates to an autonomous mobile device, a control method applied to the autonomous mobile device, and a controller. In one aspect, the present disclosure provides the autonomous mobile device, which includes: a first radar; and a controller, configured to process first radar data from the first radar to operate the autonomous mobile device.

20 Claims, 6 Drawing Sheets

(56) References Cited

U.S. PATENT DOCUMENTS

2024/0190457 A1* 6/2024 Craig ............... G01C 21/36
2024/0300539 A1* 9/2024 Donderici ......... G01S 13/86
2024/0378875 A1* 11/2024 Sajjan .............. G06V 20/58

FOREIGN PATENT DOCUMENTS

CN      117303257 A    12/2023
KR   1020210039935 A    4/2021

OTHER PUBLICATIONS

Stateczny et al., "Sensors and Sensor's Fusion in Autonomous Vehicles", Oct. 1, 2021, Sensors 2021, 21, 6586, pp. 1-8 (Year: 2021).*

Gu et al., "End-to-End Multimodal Sensor Dataset Collection Framework for Autonomous Vehicles", Jul. 29, 2023, Sensors 2023, 23, 6783, pp. 1-25 (Year: 2023).*

* cited by examiner

AUTONOMOUS MOBILE DEVICE, CONTROL METHOD APPLIED TO AUTONOMOUS MOBILE DEVICE, AND CONTROLLER

CROSS REFERENCE TO RELATED APPLICATIONS

This application is a Continuation of co-pending application Ser. No. 19/174,544, filed on Apr. 9, 2025, for which priority is claimed under 35 U.S.C. § 120, the entire contents of which are hereby incorporated by reference.

FIELD OF THE INVENTION

This application generally relates to the field of warehouse logistics and automatic driving and operation, and more particularly relates to an autonomous mobile device and a control method applied to the autonomous mobile device.

DESCRIPTION OF THE PRIOR ART

Nowadays, automatic driving and operation technologies are increasingly appearing in production and life. For example, it is expected to use an autonomous mobile device having an automatic driving and operation capability in application scenarios of warehousing and logistics, and the autonomous mobile device is expected to be capable of completing tasks such as cargo positioning, cargo handling, and environment sensing.

An application scenario of the autonomous mobile device (for example, a handling device) is complicated, and there are generally undeterminable factors. This brings challenges to the control (for example, driving and navigation) of the autonomous mobile device.

In addition, overall costs and prices of the autonomous mobile device are also factors needing to be considered. Although it is expected to acquire the top-level performance of the autonomous mobile device, high costs will be paid. Therefore, the balance between the costs and the performance is also an issue that cannot be ignored in the field.

BRIEF DESCRIPTION OF THE DRAWINGS

The disclosure in this specification mentions and includes the following figures.

Figure 1:
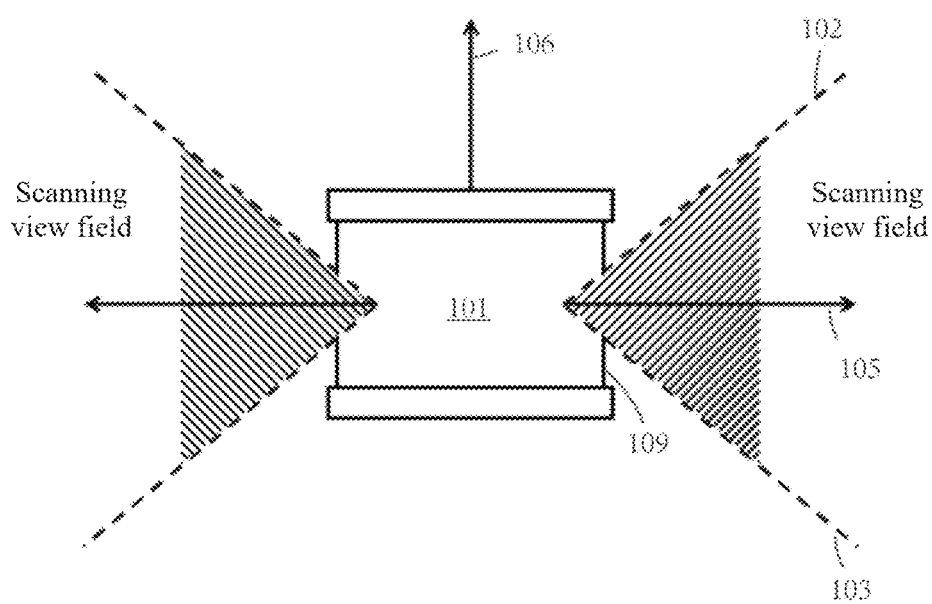
FIG. 1 is a schematic diagram of a radar according to some embodiments of the present disclosure.

According to conventions, various features illustrated in the figures may not be drawn to scale. Therefore, the sizes of the various features may be increased or reduced arbitrarily for the purpose of clearness. The shape of each component illustrated in the figures is merely exemplary, and is not to limit the actual shape of the component. In addition, for clearness, implementations illustrated in the figures may be simplified. Therefore, not all components of a given device or apparatus are described in the figures. Finally, similar reference numerals may be used to represent similar features throughout the specification and the figures.

DETAILED DESCRIPTION

To better understand the spirit of this application, further illustration will be provided below in combination with some embodiments of this application.

The descriptions of "in an embodiment" or "according to an embodiment" used in this specification do not necessarily refer to the same specific embodiment, and the descriptions of "in (some/certain) other embodiments" or "according to (some/certain) other embodiments" used in this specification do not necessarily refer to different specific embodiments. The objective is, for example, that the claimed subject matter includes a combination of all or parts of specific exemplary embodiments. The meanings of "upper" and "lower" in this specification are not limited to the relationship directly presented in the drawings, but may further include other explicit correspondence relationships, for example, "left" and "right", or the opposite of the "upper" and "lower". The terms "connection" or "coupling" used in this specification shall be understood to include "direct connection" and "connection by one or more intermediate components". The names of the various components used in this specification are for illustrative purposes only and do not play a restrictive role. Different manufacturers may use different names to refer to components with the same functions.

Various implementations of this application will be discussed in detail hereafter. Although specific implementations are discussed, it should be understood that these implementations are merely for illustrative objectives. Those skilled in the art shall recognize that other components and configurations may be used without deviating from the spirit and the protection scope of this application. The implementations of this application may not include all the components or steps in embodiments described in the specification, or the execution order of the steps may be adjusted according to practical application.

In addition, for the purpose of clarity, when some features are obvious to those skilled in the art, detailed descriptions of the features will not be discussed, so as not to obscure the descriptions of the embodiments of the present invention. Therefore, the following detailed descriptions should not be construed as limitation.

An autonomous mobile device generally refers to a mobile device capable of autonomously or semi-autonomously executing a task. For example, the autonomous mobile device may have an autonomous motion and navigation capability. In the present disclosure, the autonomous mobile device includes but is not limited to an AGV (Automated Guided Vehicle), an AMR (Autonomous Mobile Robot), a humanoid robot, an intelligent car, and a sweeping robot.

In embodiments of the present disclosure, an autonomous mobile device includes, but is not limited to, a handling device and a mobile vehicle. Tasks such as driving, control, navigation, and sensing of the autonomous mobile device (for example, an autonomous mobile device 200 shown in FIG. 2 and FIG. 3) need participation of a radar. The radar transmits acquired or sensed data to a control unit of the autonomous mobile device, and the control unit implements various operations on the autonomous mobile device based on the data. In some embodiments of the present disclosure, the data acquired or sensed by the radar includes, but is not limited to optical data. In an embodiment, the optical data includes point cloud data. In an embodiment, the optical data includes image data.

The radars used for the autonomous mobile device may include various types of radars, and these radars may be separately configured to complete different tasks. Therefore, data obtained by these radars may include the same type of data, or include different types of data. The "different types" herein may include a condition that the data types are different, and may also include a condition that data sources are different. For example, different types of data may include various radar data in the same type from different radar manufacturers. In some other embodiments, different types of data may include various radar data in different types from different radar manufacturers.

FIG. 1 shows a schematic diagram of a radar 101 used in some embodiments of the present disclosure. This schematic diagram is a side view. As shown in FIG. 1, the radar 101 is provided with a top and a base, and a side wall 109 of a radar body is defined between the top and the base. In some embodiments, the side wall 109 of the radar 101 corresponds to a scanning view field and an all-round looking direction of the radar 101. Dotted lines and shaded portions in FIG. 1 show the scanning view fields of the radar 101, and an arrow perpendicular to the side wall 109 shows the all-round looking direction 105 of the radar 101. In some embodiments, the radar 101 may include a 3D all-round looking lidar. Different from a 2D lidar which only has one laser emission direction (i.e., only may scan obstacles in one plane), the 3D all-round looking lidar may emit multiple laser beams with different emission angles to form a field-of-view angle range in the scanning direction. In some embodiments, the scanning view field may be defined by a scanning boundary 102 and a scanning boundary 103. In the context, for convenient description, an angle between the scanning boundary 102 and the scanning boundary 103 is also referred to as "scanning angle" or "field-of-view angle".

In an embodiment, the scanning angle is greater than or equal to about 90°. In another embodiment, the scanning angle is equal to about 90°. In another embodiment, the scanning angle is smaller than about 90° but is greater than or equal to about 60°. It should be understood that regardless of a specific angle value of the scanning angle, as shown in FIG. 1, a virtual straight line where the all-round looking direction 105 is located equally divides the scanning angle.

In some embodiments, the scanning view field of the radar 101 in a three-dimensional space is a 360° full view field around the radar body. In other words, the scanning view field of the radar 101 may surround the side wall 109 for a circle without a dead corner in the all-round looking direction 105. As shown in FIG. 1, the radar 101 has a radar direction 106. In some embodiments, the radar direction 106 faced by the top of the radar 101 intersects with the all-round looking direction 105, i.e., an angle is formed between the radar direction 106 and the all-round looking direction 105. In some embodiments, the radar direction 106 is perpendicular to the all-round looking direction 105, i.e., an angle between the radar direction 106 and the all-round looking direction 105 is about 90°. In some embodiments, the scanning view field of the radar 101 does not cover the radar direction 106. It should be understood that the scanning view field may surround the radar 101 for a circle by taking the virtual straight line where the radar direction 106 is located as an axial line. In some embodiments, the radar direction 106 is perpendicular to an installing plane of the radar 101.

Figure 2:
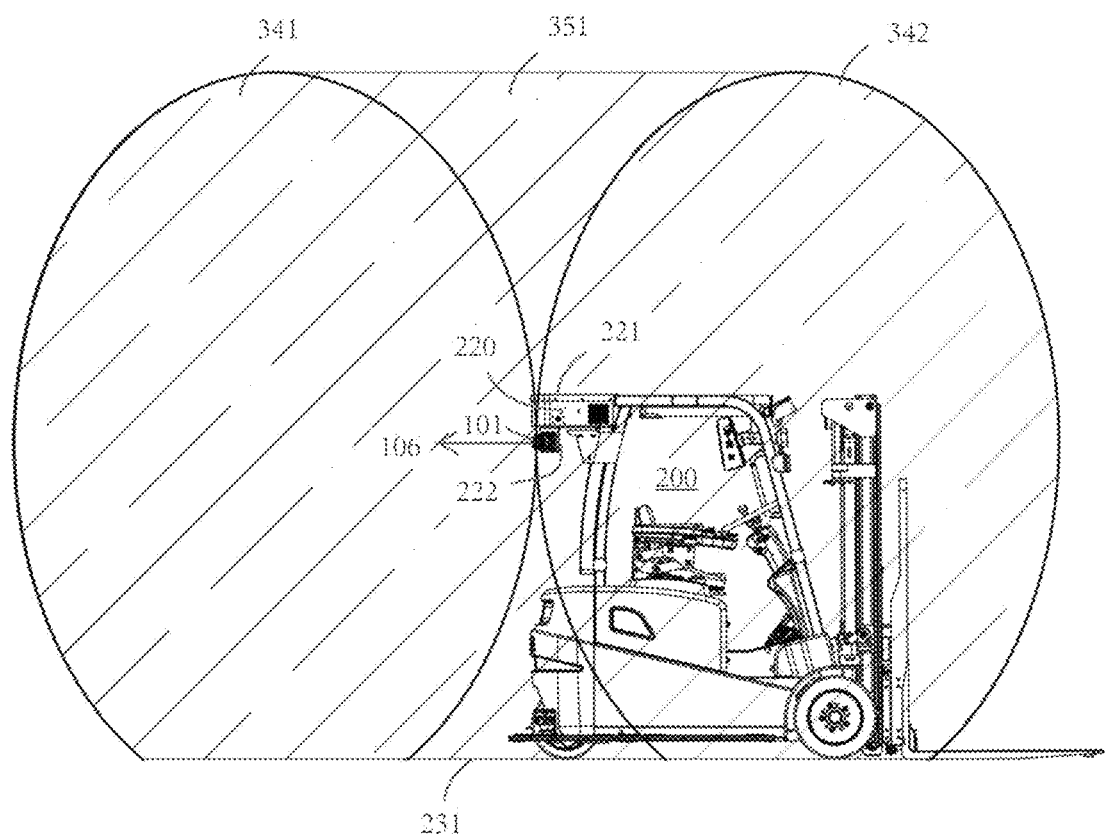
FIG. 2 is a side view of a range of radar coverage regions of an autonomous mobile device according to some embodiments of the present disclosure.

Based on requirements of different functions, the radar 101 as shown in FIG. 1 may be arranged in various positions of the autonomous mobile device. In some application scenarios, the radar 101 may be arranged on the top of the autonomous mobile device to sense obstacles around the autonomous mobile device. For convenient description, referring to an autonomous mobile device 200 as shown in FIG. 2 and ignoring the radar 101 shown therein, another radar may be arranged on a top surface 221 of the autonomous mobile device 200, and may be configured to enable the radar direction 106 of the radar to be perpendicular to a plane 231 where the autonomous mobile device 200 is located, i.e., the all-round looking direction 105 is parallel to the plane 231. Under this condition, the scanning view field of this another radar generally corresponds to one side surface of the autonomous mobile device 200. By considering that the obstacle sensing tasks need to be performed at least at the two side surfaces (for example, left side and right side) and the rear side (in the context, the "rear side" refers to a side opposite to the side where a fork of the autonomous mobile device is located) of the autonomous mobile device 200, at least 3 such radars are needed to complete the sensing tasks. As mentioned above, the overall sensing performance of the autonomous mobile device depends on the budget and costs of the radars, and the performance will be higher if the costs are higher. For example, in some embodiments of the present disclosure, the radar 101 may be arranged in any possible position (including vehicle bottom) of the autonomous mobile device 200 to realize a spherical dead-corner-free scanning view field by taking the autonomous mobile device 200 as the center.

Figure 3:
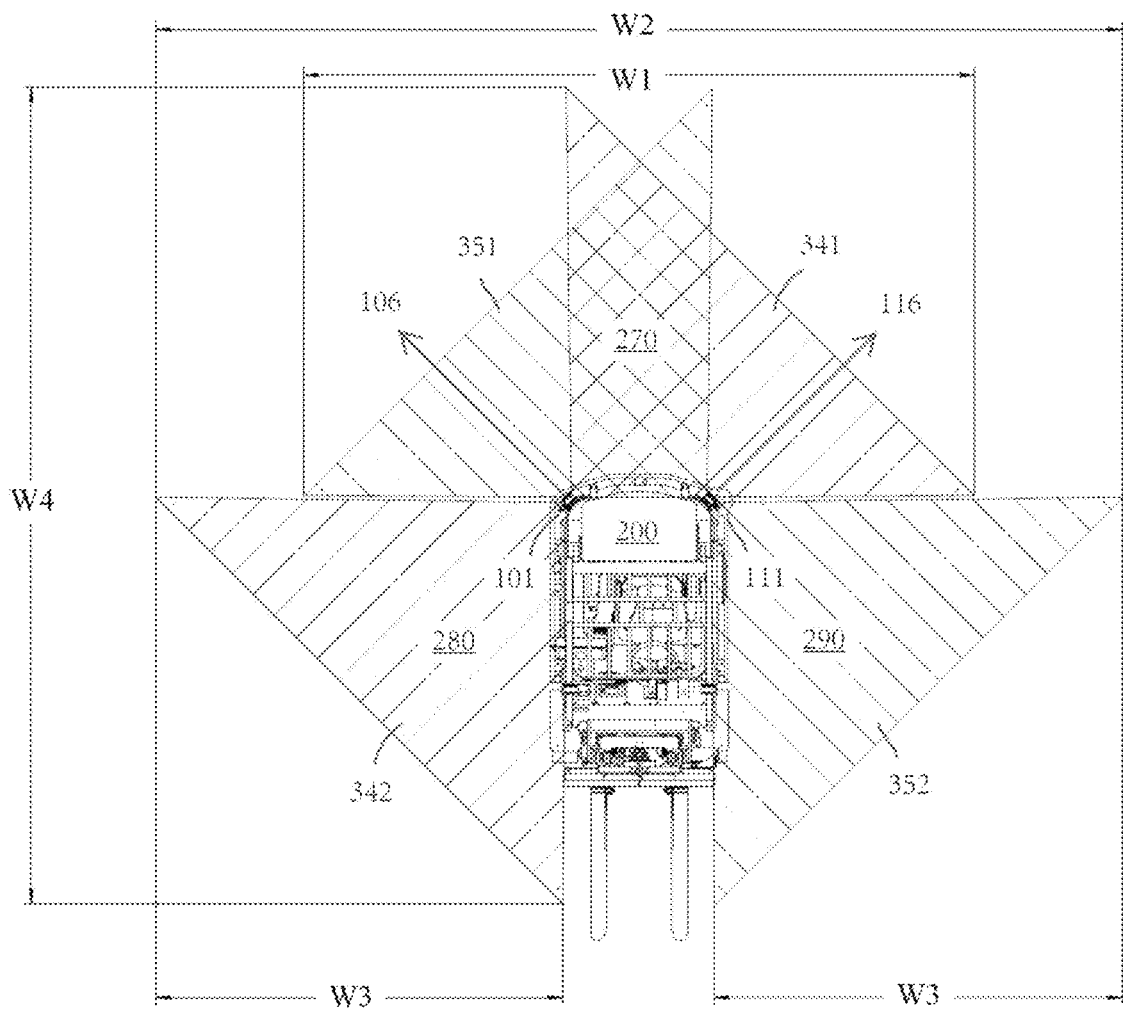
FIG. 3 is a top view corresponding to the range of the radar coverage regions shown in FIG. 2.

In some other embodiments, as shown in FIG. 2, the overall sensing performance and the radar costs of the autonomous mobile device are comprehensively considered to realize the best sensing performance by using the least radars (i.e., the lowest radar costs). Specifically, the radar 101 may be arranged in a portion near the upper side of the autonomous mobile device 200. In an embodiment, as shown in FIG. 2, the radar 101 may be arranged in an edge position of a lower surface of a top plate 220 of the autonomous mobile device 200. Referring to FIG. 2 and FIG. 3, the radar 101 may be arranged to enable the radar direction 106 to be parallel to the plane 231 supporting the autonomous mobile device 200. In some embodiments, the radar 101 may be coupled to a base 222, and for example, may be supported by the base 222. The base 222 may be further coupled to the edge position of the lower surface of the top plate 220. The above coupling may be realized by using various modes known in the art. In some embodiments, the base 222 may be fixed, and the base 222 may be installed and fixed so that the radar direction 106 is parallel to the plane 231 supporting the autonomous mobile device 200.

In some other embodiments, the base 222 may be provided with a matched actuating mechanism (not shown), and the actuating mechanism may be configured to move the base 222, so as to change an angle between the radar direction 106 of the radar 101 and the plane 231. In an embodiment as shown in FIG. 2, the angle may be 0°, i.e., the radar direction 106 is parallel to the plane 231. In some other embodiments, the actuating mechanism may move the base 222 so that the angle between the radar direction 106 and the plane 231 is greater than 0° but smaller than or equal to 30°. In some other embodiments, the actuating mechanism may move the base 222 so that the angle between the radar direction 106 and the plane 231 is greater than about 30° but smaller than or equal to about 60°. In some other embodiments, the actuating mechanism may move the base 222 so that the angle between the radar direction 106 and the plane 231 is greater than about 600 but smaller than or equal to about 90°.

As shown in FIG. 2, the radar direction 106 is parallel to the plane 231. At this moment, the scanning view field of the radar 101 may include a scanning view field region 341 and a scanning view field region 342. In combination with FIG. 3, the scanning view field region 341 may cover a three-dimensional space at a rear side 270 of the autonomous mobile device 200, and the scanning view field region 342 may cover a three-dimensional space of a side 280 of the autonomous mobile device 200.

Referring to FIG. 3, the autonomous mobile device 200 may further include a radar 111. The radar 111 may have configurations the same as all configurations of the radar 101 described above. For example, identically to the radar 101, the radar 111 may be coupled to the corresponding base 222. In some embodiments, the corresponding base 222 may be installed and fixed so that a radar direction 116 is parallel to the plane 231 supporting the autonomous mobile device 200. In some other embodiments, the corresponding base 222 may move together with the radar 111 through the corresponding actuating mechanism. In some embodiments, the radar 111 may include a 3D all-round looking lidar. In some embodiments, the radar 111 and the radar 101 are in symmetrical arrangement. For example, the radar 111 and the radar 101 may be symmetrical in respect to a symmetrical axis (2D)/symmetrical plane (3D) of the autonomous mobile device 200. In some embodiments, the radar direction 106 of the radar 101 and the radar direction 116 of the radar 111 may be symmetrical in respect to the symmetrical axis (2D)/symmetrical plane (3D) of the autonomous mobile device 200. In some embodiments, an angle between the radar direction 106 of the radar 101 and the radar direction 116 of the radar 111 may be about 90°.

The radar 111 and the radar 101 may have different configurations and/or different arrangement modes. For example, in some embodiments, the radar 111 and the radar 101 include different types of radars. In some embodiments, the radar 111 and the radar 101 belong to different radar manufacturers and/or correspond to different software development kits (SDK). In some other embodiments, the height of the radar 111 from the plane 231 may be different from (greater than or smaller than) the height of the radar 101 from the plane 231. For example, the base 222 corresponding to each of the radar 101 and the radar 111 may be arranged at different heights of the autonomous mobile device 200. In some other embodiments, the angle between the radar direction 116 and the plane 231 may be different from (greater than or smaller than) the angle between the radar direction 106 and the plane 231. For example, the actuating mechanism for each of the radar 101 and the radar 111 may actuate the corresponding base 222, so that the corresponding base 222 may have different inclination angles. Correspondingly, the radar 101 and the radar 111 may show different inclination angles.

Returning to FIG. 3, the radar 111 may be arranged to enable the radar direction 116 to be parallel to the plane 231 supporting the autonomous mobile device 200. At this moment, the scanning view field of the radar 111 may include a scanning view field region 351 and a scanning view field region 352. The scanning view field region 351 may cover a three-dimensional space at the rear side 270 of the autonomous mobile device 200, and the scanning view field region 352 may cover a three-dimensional space at a side 290 of the autonomous mobile device 200. A shown in FIG. 3, the scanning view field region 341 and the scanning view field region 351 are partially overlapped. Therefore, the scanning view fields of the radar 101 and the radar 111 may be combined to cover the three-dimensional spaces at the rear side 270, the side 280 (for example, left side or right side), the side 290 (for example, right side or left side) of the autonomous mobile device 200.

As shown in FIG. 2, regions covered by oblique lines show the overall scanning view field regions of the autonomous mobile device 200. Specifically, by observing the autonomous mobile device 200 from the side 280, the overall scanning view field regions of the autonomous mobile device 200 may include regions formed by combing the scanning view field region 341, the scanning view field region 342 and the scanning view field region 351. Correspondingly, by observing the autonomous mobile device 200 from the side 290, the overall scanning view field regions of the autonomous mobile device 200 may include regions formed by combining the scanning view field region 351, the scanning view field region 352 and the scanning view field 341.

In an embodiment, in combination with FIG. 1 and FIG. 3, the field-of-view angle of the radar 101 and the radar 111 is about 90°. Therefore, in a scanning process, the scanning boundary 103 of the radar 101 may be substantially attached to a device side wall of the autonomous mobile device 200 at the rear side 270, and is substantially attached to a device side wall of the autonomous mobile device 200 at the side 280. At the same time, the scanning boundary 103 of the radar 111 may be substantially attached to the device side wall of the autonomous mobile device 200 at the rear side 270, and substantially attached to a device side wall of the autonomous mobile device 200 at the side 290. In such a mode, the sensing tasks on the front side, left side and right side of the autonomous mobile device may be completed by only using two radars. In other words, by using this solution, on the basis of ensuring the full-coverage sensing of the three-dimensional spaces at the front side, left side and right side of the autonomous mobile device, the quantity of the used sensing radars is reduced, so that the overall costs of the autonomous mobile device are reduced.

Although it is not shown, in another embodiment, under the condition of using the arrangement of the autonomous mobile device 200 as shown in FIG. 2, the field-of-view angles of the radar 101 and the radar 111 may be greater than about 90°. Therefore, in the scanning process, the scanning view field of the radar 101 and the scanning view field of the radar 111 may both cover the device portion of the autonomous mobile device at the rear side 270, the device portion of the autonomous mobile device at the side 280, and the device portion of the autonomous mobile device at the side 290, and the device portions may include, but are not limited to the device side walls mentioned above, an outermost housing of the autonomous mobile device, any possible apparatuses arranged on an outer profile of the autonomous mobile device, and the like. In such a manner, the greater and more comprehensive scanning view field coverage may be acquired.

Although it is not shown, in another embodiment, under the condition of using the arrangement of the autonomous mobile device 200 as shown in FIG. 2, the field-of-view angles of the radar 101 and the radar 111 may be smaller than about 90°. Therefore, in the scanning process, there may be a blind area between the scanning boundary 103 of the radar 101 and the rear side 270, and there may be a blind area between the scanning boundary 103 and the side 280. Identically, there may be a blind area between the scanning boundary 103 of the radar 111 and the rear side 270, and there may be a blind area between the scanning boundary 103 and the side 290. It should be understood that the blind areas may be generally expressed by the angle between the corresponding side and the scanning boundary 103, and the angle is generally equal to a supplementary angle of the field-of-view angle. In addition, it should be understood that the blind area corresponds to the regions close to the corresponding sides of the autonomous mobile device. In some application scenarios, the sensing aiming at these regions maybe omitted. The smaller field-of-view angle generally corresponds to a lower radar price. Therefore, this solution may further reduce the overall costs of the autonomous mobile device on the basis of substantially enabling not to reduce the sensing performance of the autonomous mobile device.

It should be understood that the autonomous mobile device 200 as shown in FIG. 2 and FIG. 3 is only an example of the autonomous mobile device according to some embodiments of the present disclosure. As mentioned above, in the present disclosure, the autonomous mobile device includes various forms (for example, an AGV, an AMR, a humanoid robot, an intelligent car, a sweeping robot, and the like). Therefore, in some embodiments of the present disclosure, the autonomous mobile device 200 may be an intelligent car. In some other embodiments of the present disclosure, the autonomous mobile device 200 may be a sweeping robot. It will not be enumerated here. In other words, the radar arrangement as shown in FIG. 2 and FIG. 3 is not limited to the autonomous mobile device 200 shown in the figures, and may be applicable to any forms of autonomous mobile devices which do not depart from the substance of the present disclosure.

It should be understood that when the radar 101 shown in FIG. 1 is placed on a horizontal plane, a virtual straight line where the all-round looking direction 105 is located is parallel to the horizontal plane, and a plane formed by rotating the virtual straight line where the all-round looking direction 105 is located around an axial line (i.e., the virtual straight line where the radar direction 106 is located) of the radar 101 for a circle is parallel to the horizontal plane. Alternatively, when the radars according to some other embodiments of the present disclosure are placed on the horizontal plane, the virtual straight line where the all-round looking direction 105 is located and equally dividing the scanning angle/the field-of-view angle may form an angle with the horizontal plane (that is, the condition is not as shown in FIG. 1 that the all-round looking direction 105 is parallel to the horizontal plane).

In other words, the angle between the all-round looking direction 105 and the radar direction 106 is not about 90° as shown in FIG. 1. Specifically, in some embodiments, the all-round looking direction 105 may move towards the radar direction 106 (correspondingly, the scanning boundary 102 and the scanning boundary 103 may move towards the radar direction 106), so the angle between the all-round looking direction 105 and the radar direction 106 is smaller than 90°. At the same time, the field-of-view angle of the radar 101 may be kept at about 90°. For example, in some embodiments, the radar 101 is arranged so that during the scanning operation, the scanning boundary 103 of the radar 101 may be substantially attached to the device side wall of the autonomous mobile device 200 at the side 280. In some embodiments, the radar 101 is arranged so that during the scanning operation, the scanning boundary 103 of the radar 101 may be substantially attached to the device side wall of the autonomous mobile device 200 at the rear side 270. In some embodiments, the radar 111 is arranged so that during the scanning operation, the scanning boundary 103 of the radar 111 may be substantially attached to the device side wall of the autonomous mobile device 200 at the side 290. In some embodiments, the radar 111 is arranged so that during the scanning operation, the scanning boundary 103 of the radar 111 may be substantially attached to the device side wall of the autonomous mobile device 200 at the rear side 270.

The range of the scanning view field regions in some embodiments of the present disclosure will be described hereafter. As shown in FIG. 3, the scanning view field region at the rear side 270 may include a scanning region formed by combining the scanning view field region 341 and the scanning view field region 351, and the width of this scanning region is expressed by W1. In an embodiment, the width of a scanning region formed by combining the scanning view field region 342 and the scanning view field region 352 is expressed by W2. In an embodiment, the width of a scanning view field region formed by combining the scanning view field region 342 and the scanning view field region 351 is expressed by W3. In an embodiment, the width of a scanning view field region formed by combining the scanning view field region 352 and the scanning view field region 341 is also expressed by W3. In an embodiment, the width of a scanning view field region formed by combining the scanning view field region 341, the scanning view field region 342 and the scanning view field region 351 is expressed by W4. In an embodiment, the width of a scanning view field region formed by combining the scanning view field region 351, the scanning view field region 352 and the scanning view field region 341 is also expressed by W4.

In an embodiment, a scanning radius of the radar 101 and the radar 111 is 2000 mm. At this moment, W1 is about 4700 mm, W2 is about 6800 mm, W3 is about 2900 mm, and W4 is about 5730 mm. In other words, in an embodiment, when the scanning radius of the radar is 2000 mm, the double-radar arrangement manner as shown in FIG. 2 and FIG. 3 as described above is used. By observing the autonomous mobile device 200 from the side 280 or the side 290, the radar coverage range with the width of about 5730 mm may be acquired. In addition, by observing the autonomous mobile device 200 from the opposite side (for example, the side where the fork is located) of the rear side 270, the radar coverage range with the width of about 6800 mm may be acquired, and the radar range realizes the full coverage on the three-dimensional spaces at the left side, the right side and the rear side of the autonomous mobile device.

As described above, data sensed or acquired by the radar 101 and the radar 111 is used for performing various control operations on the autonomous mobile device. Original radar data acquired by the radar may be transmitted to each service module of the autonomous mobile device only after being processed by the SDK. The service module includes but is not limited to a positioning module, a sensing module, a safety module, and the like. Specifically, the positioning module may be configured to perform positioning operation of the autonomous mobile device in the application scenarios based at least in part on data from an upper computer (for example, a radar, a camera, a sensor, and the like). The sensing module may be configured to sense an environment around the autonomous mobile device based at least in part on the data from the upper computer, for example, whether there is a passable road around the device or not, whether the height of a front space allows the autonomous mobile device to pass or not, and the like. The safety module may be configured to enable the autonomous mobile device to operate under a safe condition based at least in part on the data from the upper computer, and for example, the safety module is configured to enable the autonomous mobile device not to injure people or other objects and to avoid the damage to the autonomous mobile device from other objects. The radar 101 and the radar 111 may include different types of radars and/or may have different types of configuration modes. In an embodiment, the radar 101 may include a radar manufactured by a manufacturer A, and the radar 111 may include a radar manufactured by a manufacturer B. The manufacturers are different, so that the radar 101 may need to use SDK A, and the radar 111 may need to use SDK B. In an embodiment, the SDK A is different from the SDK B. In an embodiment, data of the SDK A is incompatible with data of the SDK B.

Generally, the service module at the autonomous mobile device is deeply coupled with the SDK of a single manufacturer. The result is that when the service module is accessed with a radar of a new model from another manufacturer, the service module always needs to be developed to adapt to the newly accessed radar, and this brings additional work load. Additionally, the SDK of each manufacturer is generally not unified (or is incompatible), so this brings a challenge for fusing different data coming from different SDKs and corresponding to different radars at the autonomous mobile device.

Figure 4:
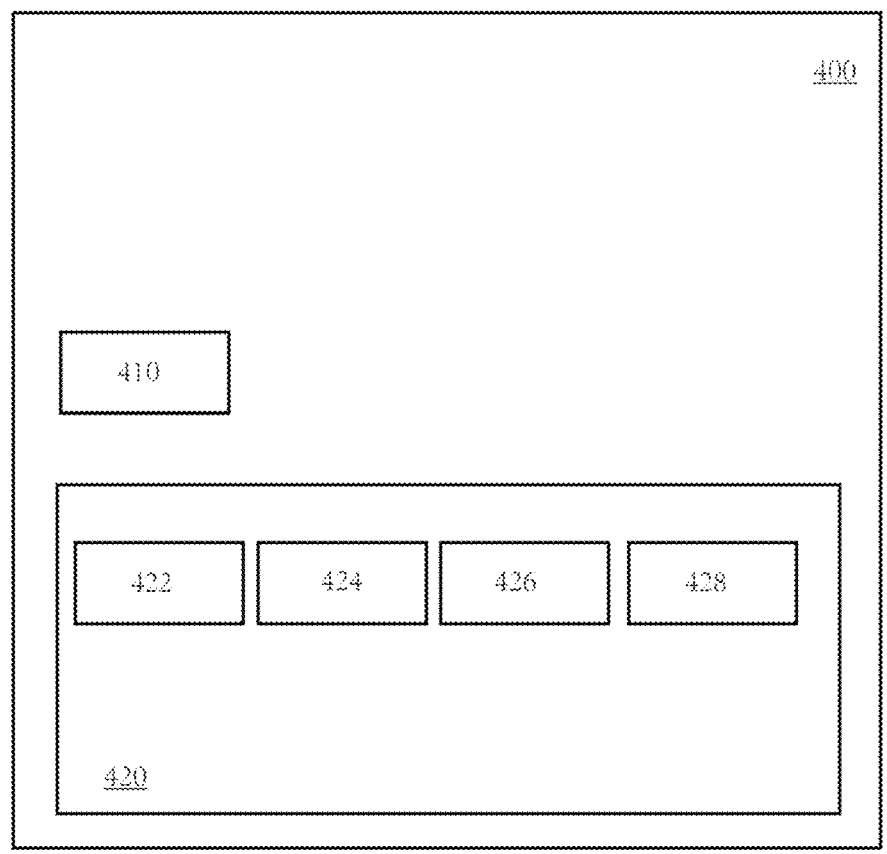
FIG. 4 is a structural block diagram of an autonomous mobile device according to some embodiments of the present disclosure.

FIG. 4 shows a structural block diagram of an autonomous mobile device according to some embodiments of the present disclosure. It should be understood that the structural block diagram is exemplary, and only shows key components/subassemblies of an autonomous mobile device 400. The components/subassemblies shown in FIG. 4 may be deleted or supplemented according to different embodiments of the present disclosure. In an embodiment, the autonomous mobile device 400 shown in FIG. 4 corresponds to the autonomous mobile device 200 shown in FIG. 2. A radar 410 in FIG. 4 is also exemplary, and does not indicate that the autonomous mobile device 400 only includes one radar. Alternatively, the radar 410 includes but is not limited to one or more radars. In an embodiment, the radar 410 includes the radar 101 and the radar 111 as shown in FIG. 3. The autonomous mobile device 400 may further include a controller 420. The controller 420 may include but is not limited to a module 422, a module 424, a module 426, a module 428, and the like. Any one of the module 424 to the module 428 may correspond to any one of the service modules described above. Non-restrictively, in some embodiments, the module 424 may correspond to the positioning module. In some embodiments, the module 426 may correspond to the sensing module. In some embodiments, the module 428 may correspond to the safety module.

In some embodiments, the controller 420 further includes a storage module (not shown), and the storage module may be shared by the module 422, the module 424, the module 426, and the module 428. In some embodiments, the controller 420 further includes a control module (not shown). Although it is not shown, it can be understood that the controller 420 may include any possible conventional modules for realizing its processing objective. In some embodiments, the instructions are stored in one or more computer readable storage media of the autonomous mobile device 400. In some embodiments, the one or more computer readable storage media are non-transitory.

The module 422 may communicate with one or more of the service modules (for example, one or more of the module 424, the module 426, and the module 428). In some embodiments, the module 422 may use an ECAL (Enhanced Communication Abstraction Layer) protocol to communicate with each service module based on shared storage. Specifically, the ECAL protocol may assign a corresponding channel (also referred to as "topic") to receive and send corresponding data output by the module 422. The communication of the ECAL protocol based on the shared storage ensures the receiving and sending of data across processes, and has the advantages of high efficiency and no network bandwidth occupation compared with network communication.

Figure 5:
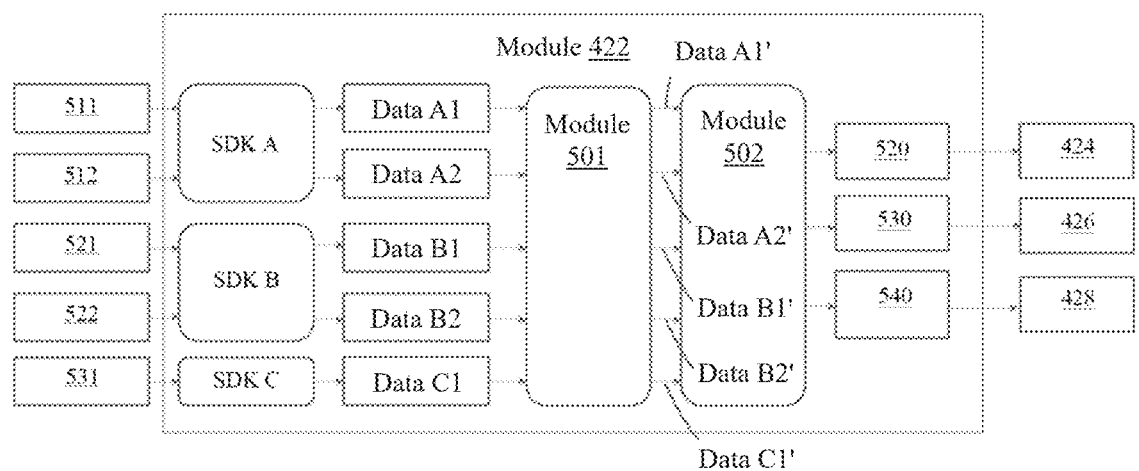
FIG. 5 is a schematic diagram of a fusing module according to some embodiments of the present disclosure.

FIG. 5 exemplarily shows various details of the module 422 in FIG. 4. It should be understood that the quantity of the subassemblies in the module 422 is not limited. In different embodiments, the quantities of the involved subassemblies are different. The module 422 may be configured to process and fuse the original data from different radars to generate fused data. The fused data may be directly used by the corresponding service module to promote the service module to complete the corresponding operation. In an embodiment, the module 422 may include an SDK layer. Exemplarily, the SDK layer may include but is not limited to an SDK A, an SDK B, and an SDK C. Although it is not shown, in another embodiment, the SDK layer may further include an SDK D. In another embodiment, the SDK layer may further include the SDK D and an SDK E. In another embodiment, the SDK layer may include the SDK A and the SDK C. In another embodiment, the SDK layer may include the SDK A and the SDK B. In another embodiment, the SDK layer may include the SDK B and the SDK C. As described above, the letters "A", "B", "C", "D", "E", and the like used after the SDK are used for representing different SDKs, for example, different SDKs from different manufacturers.

As shown in FIG. 5, the SDK A may be in communication coupling to a radar 511 and a radar 512, the SDK B may be in communication coupling to a radar 521 and a radar 522, and the SDK C may be in communication coupling to a radar 531. In other words, the radar 511 and the radar 512 may be from the same manufacturer, and the radar 521 and the radar 522 may be from the same manufacturer. In some other embodiments, the SDK A may be in communication coupling to one or more additional radars, and the one or more additional radars may be from the same manufacturer like the radar 511 and the radar 512. In some other embodiments, the SDK B may be in communication coupling to one or more additional radars, and the one or more additional radars may be from the same manufacturer like the radar 521 and the radar 522. In some other embodiments, the SDK C may be in communication coupling to one or more additional radars, and the one or more additional radars may be from the same manufacturer like the radar 531. Although it is not shown, as described above, the module 422 may further include the SDK D, and the SDK D may be in communication coupling to one or more radars from the same manufacturer.

The corresponding SDK of the SDK layer generates point cloud data after receiving original radar data of the corresponding radar. For example, after receiving the original radar data of the radar 511 and the radar 512, the SDK A generates point cloud data A1 and A2 (if not specially specified, the point cloud data is called as "data" hereafter for short). After receiving the original radar data of the radar 521 and the radar 522, the SDK B generates data B1 and B2. After receiving the original radar data of the radar 531, the SDK C generates data C1. Although it is not shown, as described above, the module 422 may further include the SDK D, and the SDK D generates corresponding point cloud data, for example, point cloud data D1, after receiving the original radar data of the corresponding radar. The data A1 may correspond to the radar 511, the data A2 may correspond to the radar 512, the data B1 may correspond to the radar 521, the data B2 may correspond to the radar 522, and the data C1 may correspond to the radar 531. It should be understood that the above corresponding relationship is only for convenient description, and intended to describe that the SDK layer processes the original radar data and generates the point cloud data of the corresponding radar. For example, if the point cloud data of the radar 511 is data A2, the data A2 may correspond to the radar 511. The SDK A-D and the data A1-D1 are only exemplary numbers, should not be understood as reference symbols in the drawings, and should not be understood as limitation to the present invention.

The point cloud data (for example, data A1, A2, B1, B2 and C1) acquired from the SDK layer may include but is not limited to a time stamp, a coordinate value (x, y, z), reflection intensity information, and the like of each point. In an embodiment, the data A1, A2, B1, B2 and C1 and other possible point cloud data are uniformly cached in a storage module/storage apparatus of the controller.

The module 422 is configured to fuse different point cloud data adapted to different SDKs. Specifically, the coordinate value in the point cloud data corresponding to each radar acquired from the SDK layer is a coordinate value of a reference coordinate system taking the corresponding radar as the center, but the coordinate value required by the service module of the autonomous mobile device is the coordinate value of a reference coordinate system taking the autonomous mobile device as the center. Referring to FIG. 5, the module 422 may include a module 501, and the module 501 may be configured to perform extrinsic parameter transformation on the coordinate value of each point of the data A1, A2, B1, B2 and C1 and any possible additional point cloud data. For example, an extrinsic parameter of the coordinate system of the radar 511 to the radar 531 and any one possible additional radar relative to the autonomous mobile device 400 may be recorded as (R, t), where R is a 3*3 rotation matrix, and t is a 3-freedom-degree translation quantity. The extrinsic parameter (R, t) may be acquired by known measures such as calibration, and it will not be described in detail herein.

Supposed that a three-dimensional coordinate value of a point in the point cloud data is p, the module 501 may transform the coordinate value of this point into a coordinate value p' of the reference coordinate system taking the autonomous mobile device 400 as the center by using the following formula:

$$p'=R*p+t \quad \text{(Formula 1)}$$

Further referring to FIG. 5, the module 422 may include a module 502. The module 502 may be coupled to the module 501. The module 502 may be configured to fuse and match the point cloud data of each radar processed by the module 501, and send the corresponding fused data to the subsequent service module. For example, fused data 520 may be sent to the module 424. Fused data 530 may be sent to the module 426. Fused data 540 may be sent to the module 428. In some other embodiments, fused data from the module 422 is sent to any other possible service modules. It should be understood that each of the fused data 520, the fused data 530 and the fused data 540 may represent a group of fused/combined point could data.

In some other embodiments of the present disclosure, different from a configuration mode as shown in FIG. 5, the fused data and the service modules may have a "multiple-to-multiple" relationship. In an embodiment, the fused data 520 may be sent to the module 424 and the module 426. In another embodiment, the fused data 520 may be sent to the module 424, the module 426 and the module 428. In another embodiment, the fused data 520 may be sent to one or more of any possible service modules. In some embodiments, the relationship between each of the fused data 530 and the fused data 540 and the service module is the same as the condition of the fused data 520 as described above, and it will not be repeated therein. In other words, in any one embodiment of the present disclosure, one or more of a plurality of groups of fused data may be sent to one or more of a plurality of groups of service modules.

In some other embodiments, one service module may be configured to receive one or more groups of fused data. In an embodiment, the module 424 may receive two groups of fused data, for example, the fused data 520 and the fused data 530. In an embodiment, the module 424 may receive three groups of fused data, for example, the fused data 520, the fused data 530 and the fused data 540. In some embodiments, the module 424 may receive any one group of fused data. In some embodiments, the module 426 and the module 428 have the same condition as the module 424 as described above, and it will not be repeated herein.

The module 502 may be configured to perform several operations to generate the fused data. In combination with the above description about the radar 101 and the radar 111, in some embodiments, the operation performed by the module 502 may include but is not limited to a time synchronization operation associated with different types of radars. In some other embodiments, the operation performed by the module 502 may include but is not limited to a frame generation operation associated with the same type of radars. In some other embodiments, the operation performed by the module 502 may include but is not limited to a time synchronization operation associated with different types of radars. In some other embodiments, the operation performed by the module 502 may include but is not limited to a frame generation operation associated with the same type of radars. In some other embodiments, the operation performed by the module 502 may include but is not limited to the time synchronization operation associated with different types of radars and the frame generation operation associated with different types of radars. In some other embodiments, the operation performed by the module 502 may include but is not limited to the time synchronization operation associated with the same type of radars and the frame generation operation associated with the same type of radars. In some other embodiments, the operation performed by the module 502 may include but is not limited to the time synchronization operation associated with the same type of radars and the frame generation operation associated with different types of radars. In some other embodiments, the operation performed by the module 502 may include but is not limited to the time synchronization operation associated with different types of radars and the frame generation operation associated with the same type of radars.

Figure 6:
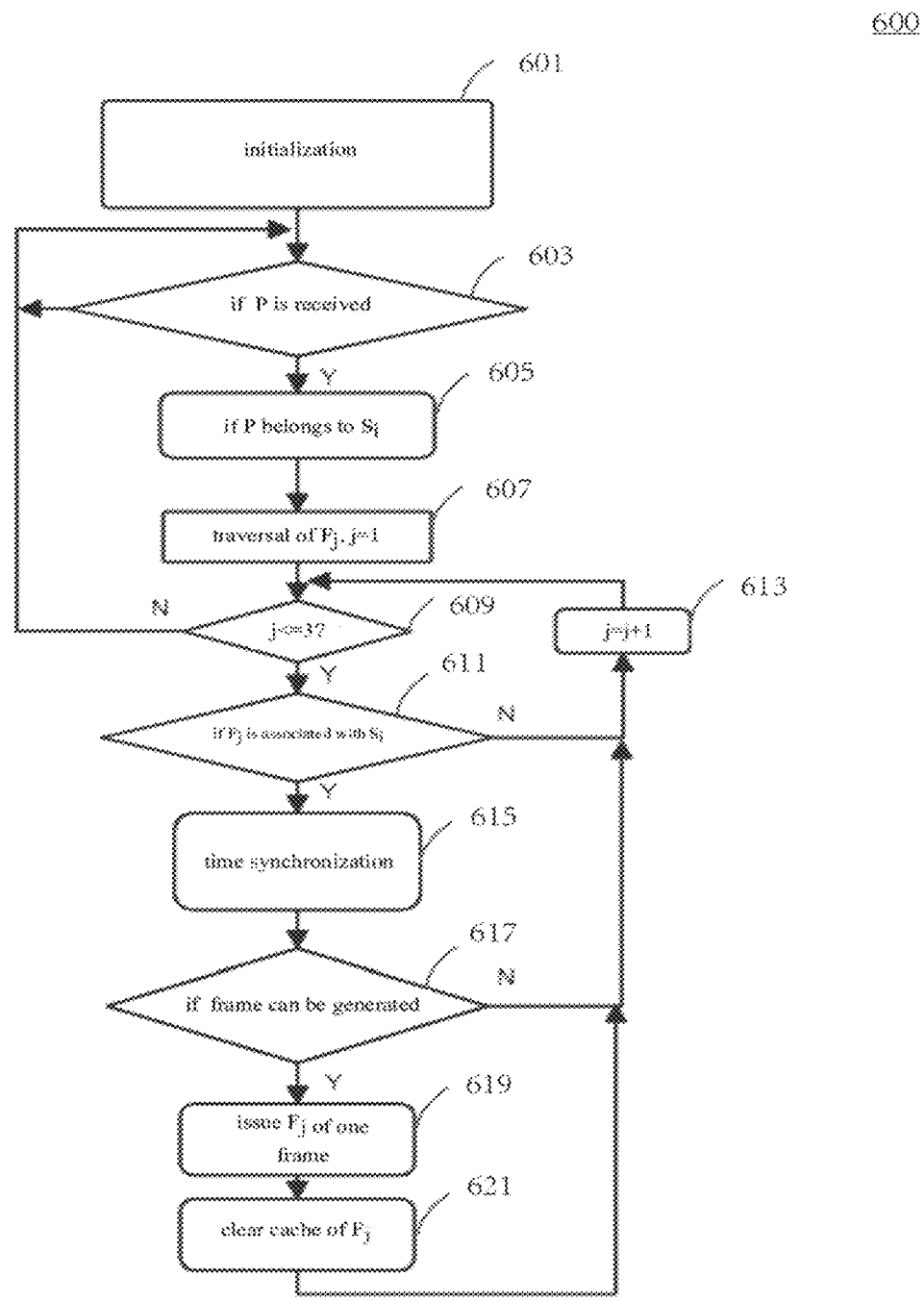
FIG. 6 is a flowchart of a method for processing radar data according to some embodiments of the present disclosure.

Operations capable of being performed by the module 502 are described in combination with FIG. 3, FIG. 5 and FIG. 6. As repeatedly emphasized above, the following descriptions are only conditions of some embodiments, and shall not be considered as the limitation to the present disclosure.

In some embodiments, the radar 511 shown in FIG. 5 corresponds to the radar 101 shown in FIG. 3. The radar 521 shown in FIG. 5 corresponds to the radar 111 shown in FIG. 3. Although it is not shown, the autonomous mobile device 200 shown in FIG. 3 may further include one or more radars.

The one or more radars may include the radar 512, the radar 522, the radar 531, and the like. As described above, each SDK of the SDK layer may be different SDKs developed by different manufacturers. The radar 511 (i.e., the radar 101) and the radar 512 may include radars from the manufacturer A. Therefore, the SDK A may process the original radar data of the radar 511 (i.e., the radar 101) and the radar 512 to generate the data A1 and the data A2. That is, the data A1 and the data A2 adapt to the SDK A. The radar 521 (i.e., the radar 111) and the radar 522 may include radars from the manufacturer B. Therefore, the SDK B may process the original radar data of the radar 521 (i.e., the radar 111) and the radar 522 to generate the data B1 and the data B2. That is, the data B1 and the data B2 adapt to the SDK B. The radar 531 includes a radar from a manufacturer C. Therefore, the SDK C may process the original radar data of the radar 531 to generate the data C1. That is, the data C1 adapts to the SDK C.

The module 422 may be configured to fuse the data which is from different SDKs and cannot be directly combined originally. In an embodiment, the module 422 may be configured to generate a group of fused data 520 based at least in part on the data A1 and the data B1. In an embodiment, the module 422 may be configured to generate a group of fused data 530 based at least in part on the data B1, the data B2 and the data C1. In an embodiment, the module 422 may be configured to generate a group of fused data 540 based at least in part on the data A1, the data A2 and the data C1. In some other embodiments, the module 422 may be configured to perform any possible combination or fusing or matching on different point cloud data (for example, the data A1, the data A2, the data B1, the data B2, the data C1, and the like) from different SDKs to meet different requirements of the service modules. As described above, the generation of a group of fused data may include the configuration of the module 501 to perform extrinsic parameter transformation on the point cloud data from the corresponding SDK. In some embodiments, the data A1 may be transformed into data A1' based on Formula 1. The data A2 may be transformed into data A2' based on Formula 1. The data B1 may be transformed into data B1' based on Formula 1. The data B2 may be transformed into data B2' based on Formula 1. The data C1 may be transformed into data C1' based on Formula 1. The transformed data A1' to C1' adapt to the three-dimensional coordinate system of the autonomous mobile device 200, i.e., the coordinate system taking the autonomous mobile device 200 as the center.

In some embodiments of the present disclosure, radars (or radar data) expected to be used by different service modules are different, so that the data from the module 501 needs to be subjected to different matching operations. It should be noted that the matching on the data from the module 501 is not simple stacking or listing on the corresponding data. Based on different requirements of the module 424, the module 426 and the module 428, the data of five radars of the radar 511 to the radar 531 needs to be used. For example, the module 424 expects to use the data of the radar 511 and the radar 521, so that the module 424 expects that the fused data 520 acquired from the module 502 may include the data A1' and the data B1'. In an embodiment, the module 426 expects to use the data of the radar 521, the radar 522 and the radar 531, so that the module 426 expects that the fused data 530 acquired from the module 502 may include the data B1', the data B2' and the data C1'. In an embodiment, the module 428 expects to use the data of the radar 511, the radar 512 and the radar 531, so that the module 428 expects that the fused data 540 acquired from the module 502 may include the data A1', the data A2' and the data C1'.

FIG. 6 shows a method 600 capable of being implemented by the module 502. In an embodiment, the autonomous mobile device 200 shown in FIG. 3 expects to use the data of the five radars of the radar 511 to the radar 531 in a period of performing the corresponding operation. In response to the implementation of the corresponding operation, a control unit (for example, the controller 420 or a corresponding subassembly) of the autonomous mobile device 200 gives out an instruction to the module 422 to further request the corresponding fused data associated to the radar 511 to the radar 531. At step 601, the module 422 initializes a radar list S and a fused point cloud list F. For convenient description, a list element of the fused point cloud list provided by the module 502 is expressed by "$F_j$", and the variable j represents the number of the list element. For example, the group of fused point cloud data 520 may be expressed as $F_1$, and the frame duration corresponding to $F_1$ may be expressed as t1. The group of fused point cloud data 530 may be expressed as $F_2$, and the frame duration corresponding to $F_2$ may be expressed as t2. The group of fused point cloud data 540 may be expressed as $F_3$, and the frame duration corresponding to $F_3$ may be expressed as t3. The frame duration refers to a time duration value of each frame. The list element of the radar list provided by the module 502 is expressed by "$S_i$", and the variable i represents the number of the list element. Therefore, the initialized fused point cloud list F may include $F_1$, $F_2$, and $F_3$. The initialized radar list S may include $S_1$, $S_2$, $S_3$, $S_4$ and $S_5$. In an embodiment, they respectively correspond to the radar 511 (the radar 101), the radar 512, the radar 521 (the radar 111), the radar 522 and the radar 531.

At step 603, the module 502 may receive the point cloud data P from the module (for example, the module 501) configured to perform extrinsic parameter transformation. In some embodiments, the point cloud data is transmitted to the module 502 in a form of a data flow or in a form of a data packet.

At step 605, the module 502 may judge whether the received point cloud data P belongs to a radar $S_i$ or not. If the judging result shows that the point cloud data P does not belong to the radar $S_i$ at step 605, the point cloud data P is abandoned, no subsequent operation is performed to wait for next coming point cloud data P, and then, the judgment of step 605 is repeated. It should be understood that all the radars in the radar list S need to be respectively judged according to step 605. For example, in embodiments described above, i=5, so that the five radars need to be respectively judged according to step 605. After each radar is judged according to step 605, step 607 to step 621 may be performed on each radar. For example, after judging that the point cloud data P belongs to the radar $S_1$ at step 605, the method 600 may be sequentially implemented step by step to step 611, so that whether the data of the radar $S_1$ is included by $F_1$ or not is judged at step 611. After judging that the point cloud data P belongs to the radar $S_2$ at step 605, the method 600 may be sequentially implemented step by step to step 611, so that whether the data of the radar $S_2$ is included by $F_1$ or not is judged at step 611. The flow processes aiming at the radar $S_3$, the radar $S_4$ and the radar $S_5$ are the same, and will not be repeated herein.

At step 607, the module 502 starts to perform traversal operation on the element $F_j$ in the fused point cloud list. At the beginning, j=1 is set. At step 609, whether "j<=3" is "true" or not is judged. If the judging result at step 609 is YES, step 611 is performed. If the judging result at step 609 is NO, the operation returns to step 603. It should be understood that according to different values of the variable j of the fused point cloud list F, the judging conditions at step 609 may be different. In another embodiment, the fused point cloud list F may have four list elements (i.e., a point cloud matching module 502 needs to provide four groups of fused point cloud data), and the above judging condition may be changed into judging whether "j<=4" is "true" or not.

At step 611, the module 502 judges whether $F_j$ is associated with the radar $S_i$ or not. For example, whether $F_j$ needs to use the point cloud data associated with the radar $S_i$ or not is judged. If the judging result at step 611 is NO, step 613 is performed. At step 613, the module 502 enables the value of the variable j to add by one, and then, the operation returns to step 609. For example, in an embodiment described above, the module 424 may expect to acquire the fused data 520 including the data A1' and the data B1', i.e., $F_1$ is associated with the radar $S_1$ (i.e., the radar 511) and the radar $S_3$ (i.e., the radar 521), but is not associated with the radar $S_2$ (i.e., the radar 512). Therefore, in this embodiment, if the judging result at step 611 is NO during judgment on the radar $S_2$, the method 600 is implemented to step 613, and the operation returns to step 609. Then, in step 611 in a new cycle, whether $F_2$ is associated with the radar $S_2$ or not is judged. For example, in an embodiment described above, the module 426 may expect to acquire the fused data 530 including the data B1', the data B2' and the data C1'. Therefore, $F_2$ is associated with the radar $S_2$, at this moment, the judging result at step 611 is YES, and the method 600 is implemented to step 615.

In some embodiments of the present disclosure, the module 422 may be configured to perform the time synchronization operation. For example, at step 615, the module 502 of the module 422 may add or insert the point cloud data P conforming to the condition (i.e., conforming to the judging condition at step 605) into a cache of $F_j$. Points in the cache of $F_j$ are arranged in a time order. Specifically, for each point in the point cloud data P, according to the time stamp of each point, the module 502 may retrieve the cache of $F_j$ from back to front until a corresponding insertion position is found, so that the time stamps of all points in the cache of $F_j$ are arranged from small to large. In an embodiment, a time stamp T1, a time stamp T2 and a time stamp T3 are arranged from small to large, so in the cache of $F_j$, a point P2 corresponding to the time stamp T2 is inserted to a position between a point P1 corresponding to the time stamp T1 and a point P3 corresponding to the time stamp T3. The time synchronization operation which the module 422 is configured to do may include sequentially arranging the point cloud data of the corresponding points in time order based on the time stamps. The fused point cloud data (i.e., $F_j$) generated by the module 422 is based on all sequenced points (i.e., all points sequenced in the cache of $F_j$).

After the point cloud data P is inserted into the cache of $F_j$, the module 422 may be configured to perform a frame generation operation. Specifically, at step 617, the module 502 of the module 422 may be configured to determine whether $F_j$ reaches the frame generation standard or not. The frame generation operation performed by the module 422 may include outputting a group of fused data in response to a condition that a difference value of the time stamps between a first point and a last point in the cache of $F_j$ is greater than or equal to a preset value. In an embodiment, the module 502 first calculates a difference value d between the time stamp of the last point and the time stamp of the first point in the cache of $F_j$. Then, the module 502 judges whether the calculated difference value d is greater than or equal to the frame duration of $F_j$. By taking $F_1$ as an example, the frame generation standard is that the difference value d is greater than or equal to t1. If it is determined that $F_j$ has reached the frame generation standard, at step 619, the module 502 may send the $F_j$ of this frame to the corresponding service module.

After the $F_j$ is sent, at step 621, the module 502 may clear the cache of $F_j$, and the method 600 returns to step 613. At step 613, the module 502 enables the value of the variable j to be added by one, so that a subsequent step, for example, step 615, may be performed on a next list element of the point cloud list F.

A method for configuring the autonomous mobile device will be described with reference to the accompanying drawings of the present disclosure. First, the radar position of the autonomous mobile device 200 is configured. In an embodiment, the radar 101 is configured so that the radar direction 106 is parallel to the plane 231 supporting the autonomous mobile device 200. The radar 111 is configured so that the radar direction 116 is parallel to the plane 231 supporting the autonomous mobile device 200. In some embodiments, the above configuration on the radar may be completed during factory delivery or maintenance of the autonomous mobile device 200. In some embodiments, the above configuration on the radar may be performed in an operation period of the autonomous mobile device 200 by the actuating mechanism. Specifically, the controller 420 of the autonomous mobile device 200 (400) may give out an instruction to the control unit of the actuating mechanism to drive the actuating mechanism, and the actuating mechanism further drives the base 222 to adjust the radar direction of the radar.

The method for configuring the autonomous mobile device may further include enabling the controller 420 to drive the radar 101 and the radar 111 to acquire the corresponding original radar data. It should be understood that after the radar configuration described above is completed, the original radar data acquired by driving the radar 101 and the radar 111 may realize the full coverage on three-dimensional spaces at the rear side, the left side and the right side of the autonomous mobile device 200. Next, the radar 101 and the radar 111 sends the acquired original radar data to the controller 420 for subsequent processing by the controller 420.

As described above with respect to FIG. 5 and FIG. 6, the original radar data of the radar 101 may only correspond to the SDK A, while the original radar data of the radar 111 may only correspond to the SDK B. Therefore, the controller 420 needs to process the original radar data so that the original radar data may be directly used by the module 424. Therefore, the module 424 may directly acquire the expected data without communication with the SDK and without the adaptation operation on the data at the module 424. In an embodiment, the method for configuring the autonomous mobile device may further include configuring the module 422 by the controller 420 to process the original radar data of the radar 101 and the radar 111. Specifically, the SDK A in the SDK layer of the module 422 receives the original radar data of the radar 101. The SDK A generates the data A1 based at least in part on the original radar data of the radar 101. The SDK B in the SDK layer of the module 422 receives the original radar data of the radar 111. The SDK B generates the data B1 based at least in part on the original radar data of the radar 111. In an embodiment, the data A1 only adapts to (or corresponds to) the SDK A, and the data B1 only adapts to (or corresponds to) the SDK B. Therefore, the data A1 and the data B1 cannot be directly stacked or combined. In other words, even so, the module 424 shall not understand the meaning of the directly stacked or combined data A1 and data B1, or may not directly acquire useful information aiming at the corresponding frame from the data.

Further, after the SDK layer completes the processing of the original radar data, the method for configuring the autonomous mobile device may further include sending the data A1 and the data B1 by the SDK layer of the module 422 to the module 501. The data A1 may include a coordinate value of the point in a reference system taking the radar 101 as the center. The data B1 may include a coordinate value of the point in a reference system taking the radar 111 as the center. In an embodiment, the module 501 uniformly transforms the coordinate values of the points in the data A1 and the data B1 into the coordinate values of the coordinate system taking the autonomous mobile device 200 as the center, so as to generate the data A1' and the data B1'. In some embodiments, the above transformation is based at least in part on extrinsic parameters of the corresponding radar. In some embodiments, the above transformation is based at least in part on extrinsic parameters of the autonomous mobile device.

Further, after the module 501 completes the data transformation, the method for configuring the autonomous mobile device may further include sending the data A1' and the data B1' to the module 502 by the module 501 of the module 422. The data A1' and the data B1' substantially correspond to different data from different radars, the time stamps of the corresponding points are disordered, and the reaching time of the data A1' and the data B1' to the module 502 is uncertain. Therefore, in an embodiment, the module 502 needs to perform the time synchronization operation on each point in the data A1' and the data B1', and finally, the point cloud information (referring to $F_1$ and a group of fused data 520 described above) of a frame is generated. As described above with respect to FIG. 6, each point in the data A1' and the data B1' is arranged in time order of the time stamp from small to large. When the point in a queue meets a preset condition, for example, when a time stamp interval of the first point and the last point in the queue is greater than the frame duration required by the module 424, the module 502 outputs a group of fused data 520.

Further, the method for configuring the autonomous mobile device may further include sending the group of fused data 520 to the module 424 by the module 502 of the module 422. The module 424 may directly use the group of fused data 520 to implement the positioning operation of the autonomous mobile device 200.

As described above, at least based on the method 600, the module 422 processes and integrates the data of different radars from different manufacturers to finally generate one or more groups of fused point cloud data capable of being directly used by the corresponding service module. In other words, the compatibility and expansibility with the SDKs from different radar manufacturers are realized by using the fusing module and the above configuration mode, and a unified data interface is provided for each service module, so that each service module does not need to be automatically accessed into different SDKs of different radar manufacturers, and the development and maintenance costs of the service module are reduced. Additionally, the fusing module described by the present disclosure may realize flexible point cloud matching according to different requirements of the service module, that is, the point cloud data corresponding to one radar may be reused by a plurality of service modules, and the one service module may use a plurality of groups of point cloud data corresponding to a plurality of radars. This greatly improves the adaptability of the autonomous mobile device aiming at different application scenarios and/or different requirements.

Additionally, according to the driving and navigation solution described above, the autonomous mobile device is configured at the hardware level and the software level simultaneously, so that the autonomous mobile device may realize the full-view-field coverage under the condition of using the radars from possibly fewer arbitrary manufacturers. Therefore, on the basis of ensuring the performance, the use costs of the hardware (for example, the radars and their matched circuits) are reduced, and the maintenance costs of the software are reduced.

According to another aspect of the present disclosure, a non-transitory computer readable medium is provided. The non-transitory computer readable medium stores instructions. When the instructions are executed, a controller is enabled to perform various steps in various methods described above. In an embodiment, the non-transitory computer readable medium is a single medium. In another embodiment, the non-transitory computer readable medium is a set of a plurality of sub media. The instructions include but are not limited to computer program instructions.

In some embodiments, the non-transitory computer readable medium includes (but is not limited to) a solid memory, an optical medium and a magnetic medium. In some other embodiments, the non-transitory computer readable medium includes a read only memory ("ROM"), a random access memory ("RAM"), an EPROM, an EEPROM, a flash memory component, and the like.

It should be understood that the instructions stored in the non-transitory computer readable medium may enable an object (which may include but is not limited to a control unit/processing system/operation unit, and the like) applying or receiving the instructions to perform various methods/steps/operations described above. The instructions include instruction sets, and the instruction sets include one or more sub instructions. In some embodiments, as described above, these instructions may be executed by the controller 420 and may enable the autonomous mobile device 400 including the controller 420 to implement any operation described in the present disclosure.

In an embodiment, the instructions stored in the non-transitory computer readable medium may enable the controller 420 to perform one or more steps in the method 600 shown in FIG. 6. In an embodiment, the instructions stored in the non-transitory computer readable medium may enable the controller 420 to drive the radar, a sensor, a camera, and the like of the autonomous mobile device to acquire any possible data required by the service module. The above data may be acquired under the condition that the autonomous mobile device is in a static state. The above data may also be acquired under the condition that the autonomous mobile device is in a dynamic state.

In an embodiment, the instructions stored in the non-transitory computer readable medium may enable the controller 420 to drive a fusing module of the autonomous mobile device to process different data from different radars. For example, the time synchronization operation described above may be performed. For example, the frame generation operation described above may be performed.

In an embodiment, the instructions stored in the non-transitory computer readable medium may enable the controller 420 to drive each SDK sub module of the SDK layer of the fusing module to process the original radar data. In an embodiment, the instructions stored in the non-transitory computer readable medium may enable the controller 420 to drive an extrinsic parameter transformation module to transform the required data into data in the coordinate system taking the autonomous mobile device as the center. In an embodiment, the instructions stored in the non-transitory computer readable medium may enable the controller 420 to drive each service module (for example, the module 424, the module 426, the module 428, and the like) of the autonomous mobile device to complete various operation tasks of the autonomous mobile device. For example, the instructions may enable the positioning module to receive the fused point cloud data from the point cloud matching module, and the fused point cloud data involves different data of different radars from different manufacturers. The positioning module uses the fused point cloud data to complete the positioning task from the autonomous mobile device.

In an embodiment, the instructions stored in the non-transitory computer readable medium may enable the controller 420 to drive one or more radars to acquire the original radar data. In an embodiment, the original radar data is the data acquired when the radar direction of one or more radars is parallel to the plane supporting the autonomous mobile device. In an embodiment, the instructions stored in the non-transitory computer readable medium may enable the controller 420 to convert and fuse the original radar data into one or more groups of fused data. The instructions may further enable the controller 420 to perform the positioning operation of the autonomous mobile device based at least in part on the one or more groups of fused data.

In an embodiment, the instructions stored in the non-transitory computer readable medium may enable the controller 420 to give out a command to the control unit of the actuating mechanism coupled with the base of the radar, so as to configure the angle between the radar direction of the radar and the plane supporting the autonomous mobile device.

The methods/steps/operations performed based on the instructions stored in the non-transitory computer readable medium may include but are not limited to the methods/steps/operations listed above. It should be understood that the methods/steps/operations related to various aspects of the autonomous mobile device may be abstracted as instructions stored in the non-transitory computer readable medium, and these instructions are issued to corresponding objects in a specified instruction period to finally implement various methods/steps/operations.

The descriptions in this specification are provided to enable those skilled in the art to implement or use this application. Various modifications to this application will be apparent to those skilled in the art, and general principles defined in this specification may be applied to other forms of variation without departing from the spirit or scope of this application. Therefore, this application is not limited to the embodiments and designs described in this specification, but is given the broadest scope consistent with the principles and novel features disclosed in this specification.

We claim:

1. An autonomous mobile device, comprising:
a plurality of radars configured to generate radar data;
a controller, the controller executing a program instruction to implement each of following operations:
generating point cloud data comprising first data based on the radar data;
initializing a first list and a second list;
determining whether the first data corresponds to any element in the first list;
in response to the determination that the first data corresponds to a first element in the first list, determining whether the first element in the first list is associated with a first element in the second list; and
in response to the determination that the first element in the first list is associated with the first element in the second list, inserting the first data into a first cache of the first element in the second list, wherein the first list is a radar list and the second list is a fused point cloud list.

2. The autonomous mobile device according to claim 1, wherein the operations further comprise:
determining whether second data corresponds to any element in the first list;
in response to the determination that the second data corresponds to a second element in the first list, determining whether the second element in the first list is associated with the first element in the second list; and
in response to the determination that the second element in the first list is associated with the first element in the second list, inserting the second data into the first cache of the first element in the second list.

3. The autonomous mobile device according to claim 2, wherein the operations further comprise:
processing first original data based at least in part on a first software development kit (SDK) to acquire the first data; and
processing second original data based at least in part on a second SDK to acquire the second data.

4. The autonomous mobile device according to claim 3, wherein the first data and the second data are incompatible.

5. The autonomous mobile device according to claim 3, wherein the first SDK belongs to a first manufacturer, and the second SDK belongs to a second manufacturer different from the first manufacturer.

6. The autonomous mobile device according to claim 1, wherein the operations further comprise:
in response to the determination that the first data does not correspond to any element in the first list, abandoning the first data, and waiting for next piece of data in a data flow.

7. The autonomous mobile device according to claim 1, wherein the operations further comprise:
in response to the determination that the first element in the first list is not associated with the first element in the second list, sequentially determining whether the first element in the first list is associated with other elements in the second list.

8. The autonomous mobile device according to claim 1, wherein all data in the first cache is arranged sequentially according to a time order.

9. The autonomous mobile device according to claim 8, wherein the operations further comprise:
determining whether the first cache meets a standard; and
in response to the determination that the standard is met, outputting all data in the first cache, and clearing the first cache.

10. The autonomous mobile device according to claim 9, wherein the operations further comprise:
determining a difference value between data at the earliest time point and data at the latest time point in all data in the first cache; and
determining whether the difference value is greater than or equal to a frame duration of a corresponding frame, and determining that the standard is met when the difference value is greater than or equal to the frame duration.

11. The autonomous mobile device according to claim 9, wherein the operations further comprise:
in response to a condition that the first cache is cleared, determining whether the first element in the first list is associated with the second element in the second list; and
in response to the determination that the first element in the first list is associated with the second element in the second list, inserting the first data into a second cache of the second element in the second list.

12. The autonomous mobile device according to claim 11, wherein a first group of elements in the first list are associated with the first element in the second list, a second group of elements in the first list are associated with the second element in the second list, and the first group of elements are different from the second group of elements.

13. The autonomous mobile device according to claim 8, wherein the first data comprises a first time stamp, and the operations further comprise:
inserting the first data into a corresponding position of the first cache based on the first time stamp.

14. The autonomous mobile device according to claim 1, wherein the operations further comprise:
configuring the first SDK to generate third data based on the first original data; and
configuring the second SDK to generate fourth data based on the second original data.

15. The autonomous mobile device according to claim 14, wherein the third data comprises data in a coordinate system taking the first element in the first list as a center, and the fourth data comprises data in a coordinate system taking the second element in the first list as a center.

16. The autonomous mobile device according to claim 15, wherein the operations further comprise:
converting the third data into the first data; and
converting the fourth data into the second data.

17. The autonomous mobile device according to claim 16, wherein each of the first data and the second data comprises data in a coordinate system taking the autonomous mobile device as a center.

18. The autonomous mobile device according to claim 1, wherein each element in the first list represents a corresponding radar in a plurality of radars, and each element in the second list represents a corresponding group of fused data in a plurality of groups of fused data.

19. A method for autonomous mobile device, comprising:
generating, by a plurality of radars of the autonomous mobile device, radar data;
receiving, by a controller of the autonomous mobile device, the radar data;
generating, by the controller, point cloud data comprising first data based on the radar data;
initializing, by the controller, a first list and a second list;
determining, by the controller, whether the first data corresponds to any element in the first list;
in response to the determination that the first data corresponds to a first element in the first list, determining, by the controller, whether the first element in the first list is associated with a first element in the second list; and
in response to the determination that the first element in the first list is associated with the first element in the second list, inserting, by the controller, the first data into a first cache of the first element in the second list, wherein the first list is a radar list and the second list is a fused point cloud list.

20. A controller, for autonomous mobile device, comprising:
software development kit (SDK) modules configured to:
receive radar data generated by a plurality of radars of the autonomous mobile device; and
generate point cloud data comprising first data based on the radar data;
a fuse module configured to:
initializing a first list and a second list;
determining whether the first data corresponds to any element in the first list;
in response to the determination that the first data corresponds to a first element in the first list, determining whether the first element in the first list is associated with a first element in the second list; and
in response to the determination that the first element in the first list is associated with the first element in the second list, inserting the first data into a first cache of the first element in the second list, wherein the first list is a radar list and the second list is a fused point cloud list.

* * * * *